(12) United States Patent
Kushida

(10) Patent No.: US 9,976,015 B2
(45) Date of Patent: May 22, 2018

(54) TIRE RUBBER COMPOSITION

(71) Applicant: The Yokohama Rubber Co., LTD., Minato-ku, Tokyo (JP)

(72) Inventor: Naoki Kushida, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 30 days.

(21) Appl. No.: 15/102,180

(22) PCT Filed: Dec. 5, 2014

(86) PCT No.: PCT/JP2014/082222
§ 371 (c)(1),
(2) Date: Jun. 6, 2016

(87) PCT Pub. No.: WO2015/083818
PCT Pub. Date: Jun. 11, 2015

(65) Prior Publication Data
US 2016/0304708 A1  Oct. 20, 2016

(30) Foreign Application Priority Data

Dec. 6, 2013  (JP) ................. 2013-253119

(51) Int. Cl.
| | |
|---|---|
| C08L 45/00 | (2006.01) |
| C08L 9/06 | (2006.01) |
| B60C 1/00 | (2006.01) |
| C08K 3/04 | (2006.01) |
| C08L 9/00 | (2006.01) |
| C08L 45/02 | (2006.01) |

(52) U.S. Cl.
CPC .............. *C08L 9/06* (2013.01); *B60C 1/00* (2013.01); *B60C 1/0016* (2013.01); *C08K 3/04* (2013.01); *C08L 9/00* (2013.01); *C08L 45/02* (2013.01)

(58) Field of Classification Search
CPC ...................................................... C08L 9/06
USPC ........................................................ 524/518
See application file for complete search history.

(56) References Cited

U.S. PATENT DOCUMENTS

| | | | |
|---|---|---|---|
| 5,428,109 A | 6/1995 | Kuroiwa et al. | |
| 6,265,478 B1 | 7/2001 | Kralevich, Jr. et al. | |
| 6,316,567 B1 | 11/2001 | Kralevich, Jr. et al. | |
| 8,722,806 B2 * | 5/2014 | Uchiyama | B60C 1/0016 524/525 |
| 2010/0113703 A1 | 5/2010 | Houjo et al. | |
| 2011/0196100 A1 | 8/2011 | Uchiyama et al. | |

FOREIGN PATENT DOCUMENTS

| | | |
|---|---|---|
| JP | H06-0184249 | 7/1994 |
| JP | 2001-098036 | 4/2001 |
| JP | 2008-169295 | 7/2008 |
| JP | 2008-169298 | 7/2008 |
| JP | 2009-215540 | 9/2009 |
| JP | 2010-270254 | 12/2010 |
| JP | 2010-275428 | 12/2010 |
| WO | WO 1998/24848 | 6/1998 |
| WO | WO 2008/084860 | 7/2008 |
| WO | WO 2009/0102067 | 8/2009 |

OTHER PUBLICATIONS

International Search Report for International Application No. PCT/JP2014/082222 dated Mar. 17, 2015, 4 pages, Japan.

\* cited by examiner

*Primary Examiner* — Hui Chin

(74) *Attorney, Agent, or Firm* — Thorpe North & Western

(57) ABSTRACT

A tire rubber composition that improves dry grip performance to or beyond conventional levels, while retaining grip performance sustainability and wear resistance during high-speed running is provided. A tire rubber composition comprising 40 to 180 parts by weight of carbon black having a nitrogen adsorption specific surface area of 80 to 400 m²/g and 1 to 100 parts by weight of aromatic copolymer blended in 100 parts by weight of diene rubber, the aromatic copolymer being a copolymer of an α-methylstyrene derivative represented by general formula (I) and indene.

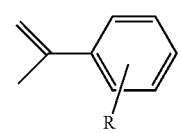

(I)

10 Claims, 1 Drawing Sheet

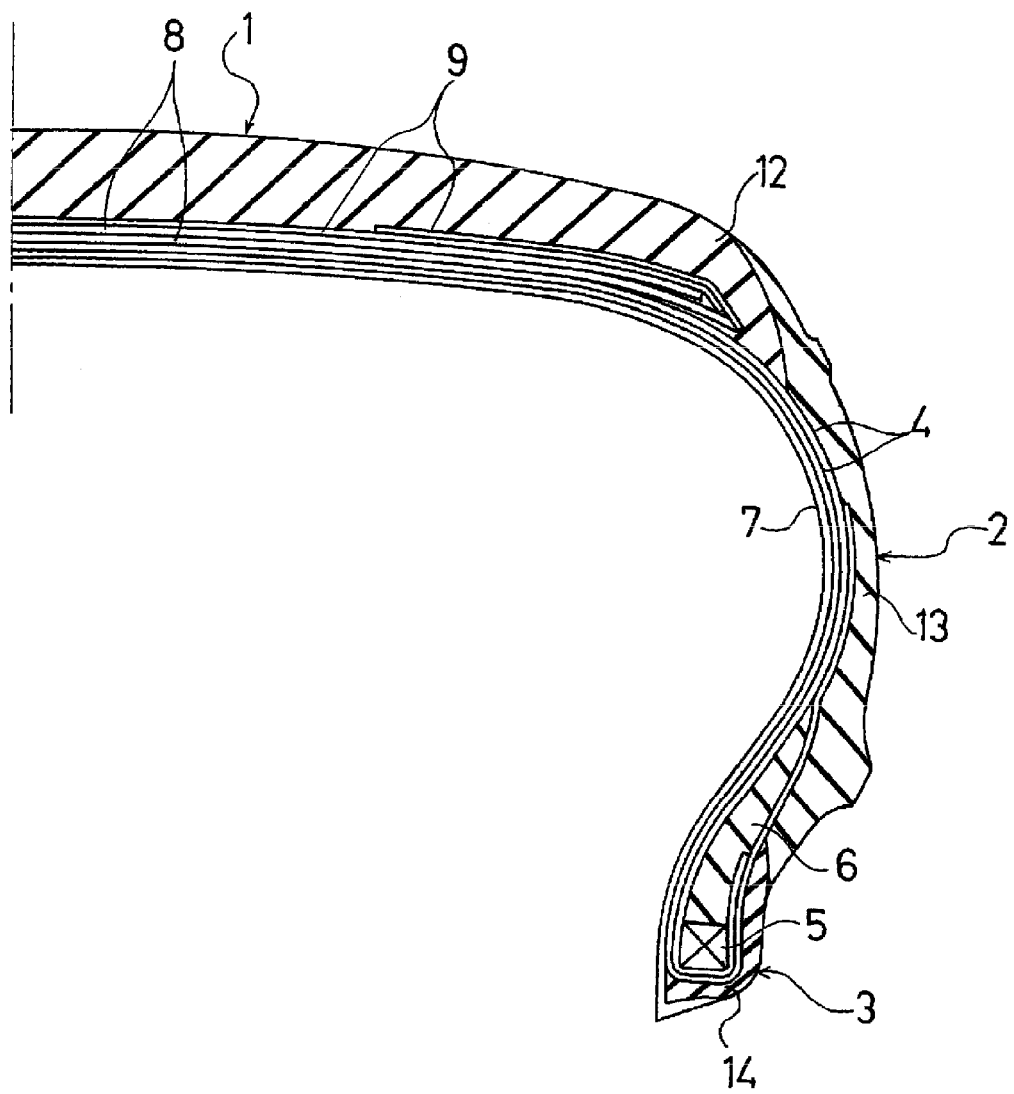

TIRE RUBBER COMPOSITION

TECHNICAL FIELD

The present technology relates to a tire rubber composition and particularly relates to a tire rubber composition that enhances dry grip performance to and beyond conventional levels, while retaining grip performance sustainability and wear resistance during high-speed running.

BACKGROUND ART

It is known that the grip performance of a pneumatic tire is greatly affected by tire temperature, and sufficient grip performance is not achieved in the low-temperature state. In particular, for racing tires for running on circuits, a rubber composition configuring tread is required to have exceptionally good dry grip performance. Therefore, a large quantity of carbon black fine particles or styrene-butadiene rubber with high glass transition temperature is blended into a rubber composition for use in tire treads. However, modulus and rubber strength of rubber compositions above will easily decrease in the high-temperature state. For this reason, when high-speed running continue for a long duration, wear resistance decrease, the state of wear of the tread surface negatively affected, dry grip performance gradually decrease due to heat sag, and, depending on the case, a blowout occurs.

Japanese Unexamined Patent Application Publication No. 2008-169295A proposes improvements of both tire initial grip performance and running stability by blending homopolymer resin and/or copolymer resin of an aromatic vinyl compound with the softening point of not lower than 140° C. to a tire rubber composition. However, performance requirements for a racing tire by users are becoming higher and there is a need for a tire rubber composition that can improve dry grip performance to or beyond conventional levels while retaining grip performance sustainability and wear resistance.

SUMMARY

The present technology provides a tire rubber composition that improves dry grip performance to or beyond conventional levels, while retaining grip performance sustainability and wear resistance during high-speed running.

A tire rubber composition of the present technology is a tire rubber composition comprising 40 to 180 parts by weight of carbon black having a nitrogen adsorption specific surface area of 80 to 400 m²/g and 1 to 100 parts by weight of aromatic copolymer blended in 100 parts by weight of diene rubber, the aromatic copolymer being a copolymer of an α-methylstyrene derivative represented by general formula (I) and indene:

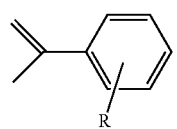

(I)

(In the formula, R is an alkyl group having from 1 to 3 carbons).

A tire rubber composition of the present technology can improve dry grip performance while retaining grip performance sustainability and wear resistance to or beyond conventional levels by blending 1 to 100 parts by weight of copolymer of a specified α-methylstyrene derivative and indene; and 40 to 180 parts by weight of carbon black having a nitrogen adsorption specific surface area of 80 to 400 m²/g; in 100 parts by weight of diene rubber.

A softening point of the aromatic copolymer is preferably 100 to 150° C., because it can realize a good grip performance from the initial to the later in running.

A pneumatic tire, in which the rubber composition described above is used in the tread portion thereof, can improve dry grip performance while retaining grip performance sustainability and wear resistance during high-speed running to or beyond conventional levels, and is particularly suitable for use in a racing tire.

BRIEF DESCRIPTION OF DRAWINGS

FIG. 1 is a partial cross-sectional view in a tire meridian direction that illustrates an example of an embodiment of a pneumatic tire in which a tire rubber composition of the present technology is used.

DETAILED DESCRIPTION

FIG. 1 illustrates an example of an embodiment of a pneumatic tire in which a tire rubber composition is used. The pneumatic tire includes a tread portion 1, a sidewall portion 2, and a bead portion 3.

In FIG. 1, in a pneumatic tire, two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of a belt layer 8, formed by arranging reinforcing cords, which extend inclined in the tire circumferential direction, in the tire axial direction at a predetermined pitch and embedding these reinforcing cords in a rubber layer, are disposed on an outer circumferential side of the carcass layer 4 of the tread portion 1. The reinforcing cords of the two layers of the belt layer 8 intersect interlaminarly so that the directions of inclination with respect to the tire circumferential direction are opposite each other. The belt cover layer 9 is disposed on an outer circumferential side of the belt layer 8. The tread portion 1 is formed from a tread rubber layer 12 on an outer circumferential side of the belt cover layer 9. The tread rubber layer 12 is preferably configured by the tire rubber composition of the present technology. A side rubber layer 13 is disposed outward of the carcass layer 4 in each side wall portion 2, and a rim cushion rubber layer 14 is provided outward of the portion of the carcass layer 4 that is folded back around each of the bead portions 3. It should be noted that a racing tire is not limited to an embodiment of the pneumatic tire described in FIG. 1 as an example.

In a tire rubber composition of the present technology, a rubber component is diene rubber, examples of which include natural rubber, isoprene rubber, butadiene rubber, styrene-butadiene rubber, acrylonitrile butadiene rubber, butyl rubber, ethylene-α-olefin rubber, chloroprene rubber and the like. Of these, styrene-butadiene rubber is preferable.

A content of styrene included in the styrene-butadiene rubber is preferably from 25 to 50 weight %, and more preferably from 30 to 45 weight %. The content of styrene within this range can result in excellent dry grip performance. In the present specification, the content of styrene is measured by infrared spectroscopy (the Hampton method).

A vinyl content in the styrene-butadiene rubber is preferably from 10 to 75 weight % and more preferably from 15 to 70 weight %. The content of vinyl within this range can achieve excellent dry grip performance. In the present specification, the content of vinyl alone is measured by infrared spectroscopy (the Hampton method).

A weight average molecular weight of the styrene-butadiene rubber is preferably from 500,000 to 2,000,000, and more preferably from 750,000 to 1,800,000. The weight average molecular weight within this range achieve excellent dry grip performance and sustainability. In the present specification, the weight average molecular weight of the styrene-butadiene rubber is measured by gel permeation chromatography (GPC) based on calibration with polystyrene standards.

A glass transition temperature (Tg) of the suitable styrene-butadiene rubber is preferably from −45 to −5° C., and more preferably from −40 to −10° C. The glass transition temperature (Tg) within this range can achieve excellent dry grip performance and sustainability. For the glass transition temperature (Tg), a thermograph is measured by differential scanning calorimetry (DSC) at a rate of temperature increase of 20° C./minute and the temperature at the midpoint of the transition region is defined as the glass transition temperature. When the styrene-butadiene rubber is an oil extended product, the glass transition temperature is the glass transition temperature of the styrene-butadiene rubber in a state where the oil extension component (the oil) is not included.

The content of the styrene-butadiene rubber is preferably from 20 to 100 weight % and more preferably from 35 to 100 weight % in 100 weight % of the diene rubber. The content of styrene-butadiene rubber within this range can achieve excellent dry grip performance and sustainability.

In the tire rubber composition of the present technology, an aromatic copolymer is blended, including a copolymer of an α-methylstyrene derivative represented by the general formula (I) below and indene:

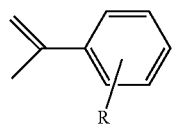

(In the formula, R is an alkyl group having from 1 to 3 carbons).

In the general formula (I), R is methyl, ethyl, n-propyl or isopropyl, and preferably methyl. The copolymer of an α-methylstyrene derivative and indene described above can be co-polymerized by a method normally employed. In addition, the aromatic copolymer may be appropriately selected from commercially available products.

Blending the aromatic copolymer including a copolymer of an α-methylstyrene derivative represented by the general formula (I) above and indene in the rubber composition can greatly improve dry grip performance of a pneumatic tire using the rubber composition without reducing the sustainability and wear resistance thereof. Although a conventional rubber composition, in which tackifying resin is blended, may be able to improve dry grip performance, there are durability issues for the tire at a high temperature caused by high-speed running such as rapid decrease in grip performance or degradation in wear resistance. To counter these issues, blending the aromatic copolymer described above instead of the tackifying resin can improve dry grip performance while retaining grip performance sustainability and wear resistance.

In the present technology, the compounded quantity of the copolymer of the α-methylstyrene derivative and indene is from 1 to 100 parts by weight, preferably from 10 to 60 parts by weight, per 100 parts by weight of the diene rubber. By making the compounded quantity of the copolymer of an α-methylstyrene derivative and indene not less than 1 part by weight, excellent dry grip performance and sustainability can be achieved. By making the compounded amount of the copolymer of an α-methylstyrene derivative and indene not greater than 100 part by weight, excellent dry grip performance and sustainability can be achieved.

A tire rubber composition of the present technology can improve dry grip performance while retaining grip performance sustainability and wear resistance to or beyond conventional levels by blending the aromatic copolymer described above and carbon black described below together. A softening point of the aromatic copolymer is preferably 100 to 150° C., and more preferably 120 to 145° C. The softening point of the aromatic copolymer not lower than 100° C. can achieve excellent dry grip performance. The softening point of the aromatic copolymer not higher than 150° C. can achieve excellent grip performance at initial running. Note that the softening point of the aromatic copolymer is measured in accordance with JIS (Japanese Industrial Standard) K6220-1 (ring and ball method).

The tire rubber composition of the present technology includes 40 to 180 parts by weight of carbon black having a nitrogen adsorption specific surface area of 80 to 400 m²/g per 100 parts by weight of diene rubber.

For carbon black used in the rubber composition of the present technology, the nitrogen adsorption specific surface area ($N_2SA$) thereof is 80 to 400 m²/g, preferably 150 to 400 m²/g, and more preferably 250 to 390 m²/g. Carbon black having $N_2SA$ of not less than 80 m²/g can ensure grip performance. Carbon black having $N_2SA$ of not greater than 400 m²/g can retain wear resistance. The $N_2SA$ of the carbon black is obtained in accordance with JIS K6217-2.

The compounded amount of the carbon black is from 40 to 180 parts by weight, preferably from 70 to 160 parts by weight, and more preferably from 90 to 140 parts by weight, per 100 parts by weight of the diene rubber. The compounded amount of the carbon black not less than 40 parts by weight can ensure dry grip performance. The compounded amount of the carbon black not greater than 180 parts by weight can retain grip performance sustainability and wear resistance.

The tire rubber composition of the present technology may also include other fillers other than carbon black as long as they may not hinder the present technology. Examples of other fillers include silica, clay, mica, talc, calcium carbonate, aluminum hydroxide, aluminum oxide, titanium oxide, and the like. It should be noted that the tire rubber composition preferably includes no filler other than carbon black to improve dry grip performance.

The tire rubber composition may also include various compounding agents that are commonly used in tire rubber compositions. Examples thereof include vulcanization or cross-linking agents, vulcanization accelerators, antiaging agents, plasticizers, processing aids, liquid polymers, thermosetting resins, and the like. These compounding agents can be kneaded by a common method to obtain a rubber composition that can then be used for vulcanization or cross-linking. These compounding agents can be compounded in typical amounts conventionally used so long as the features of the present technology are not hindered. The tire rubber composition can be produced by mixing the above-mentioned components using a known rubber kneading machine such as a Banbury mixer, a kneader, a roller, or the like.

The tire rubber composition of the present technology can be suitably used in a pneumatic tire, and particularly in a racing pneumatic tire for dry running on circuits. A pneumatic tire in which the rubber composition is used in a tread portion thereof can improve dry grip performance to or beyond conventional levels while ensuring grip performance and wear resistance in a high temperature state during high-speed running.

The present technology is further described below using examples. However, the scope of the present technology is not limited to these examples.

EXAMPLES 13 tire rubber compositions (Working Examples 1 to 5 and Comparative Examples 1 to 8) were prepared according to the formulations shown in Tables 1 and 2 with the blending agents shown in Table 3 as common components. With the exception of the sulfur and the vulcanization accelerators, the components were kneaded in a 1.8 L sealed mixer at 160° C. for 5 minutes. The mixtures were then extruded as master batches, the sulfur and the vulcanization accelerators were added, and the mixtures were then kneaded on an open roll. Note that in Tables 1 and 2, the net compounded amount of each rubber component is shown in parentheses for SBR that contains extension oil. The added amounts of the common compounding agents shown in Table 3 are expressed in parts by weight per 100 parts by weight of the diene rubbers (100 parts by weight of the net amount of rubber) shown in Tables 1 and 2.

Sample pieces were fabricated by pressure vulcanizing the obtained 13 types of tire rubber composition in a mold having a predetermined shape for 20 minutes at 160° C. Then, tan δ (100° C.), 300% modulus (100° C.) and tensile strength at break (100° C.) in the high-temperature state were measured according to the methods described below.

Dry grip performance (tan δ at 100° C.)

As an indicator of dry grip performance, loss tangent, tan δ (100° C.), was evaluated for the obtained sample pieces. tan δ was measured using a viscoelasticity spectrometer (manufactured by Toyo Seiki Seisaku-sho, Ltd.) under the following conditions: 10% initial strain, ±2% amplitude, 20 Hz frequency, and 100° C. temperature. The obtained results are shown in the "tan δ (100° C.)" rows of Tables 1 and 2, with the index value of Comparative Example 1 being 100. A higher index value of tan δ (100° C.) means superior dry grip performance when the composition is made into a pneumatic tire. 300% Modulus and tensile strength at break (100° C.)

JIS #3 dumbbell-type test pieces (thickness: 2 mm) were punched out from the obtained test pieces in accordance with JIS K6251. Tests were conducted at 100° C. at a pulling rate of 500 mm/minute, and 300% modulus (300% deforming stress) and tensile strength at break were measured. The obtained results are shown in the "High-temperature Modulus" and "High-temperature Tensile Strength at Break" rows of Tables 1 and 2, with the value of Comparative Example 1 expressed as an index of 100.

Greater index values of the high-temperature modulus (300% modulus at 100° C.) mean greater stiffness in the high-temperature state and excellent grip performance sustainability, when the composition is made into a pneumatic tire and subjected to high-speed running for a long duration. Greater index values of the high-temperature breaking strength (tensile strength at break at 100° C.) mean greater tensile strength at break in the high-temperature state, and excellent wear resistance in the high-temperature state, when the composition is made into a pneumatic tire and subjected to high-speed running for a long duration.

TABLE 1

|  |  | Comparative Example 1 | Comparative Example 2 | Comparative Example 3 | Comparative Example 4 | Comparative Example 5 | Comparative Example 6 |
| --- | --- | --- | --- | --- | --- | --- | --- |
| SBR 1 | Parts by weight | 137.5 (100) | 137.5 (100) | 137.5 (100) | 137.5 (100) | 137.5 (100) | 137.5 (100) |
| CB1 | Parts by weight | 100 | 100 | 100 |  | 30 | 200 |
| CB2 | Parts by weight |  |  |  | 100 |  |  |
| Copolymer 1 | Parts by weight |  | 20 |  |  |  |  |
| Copolymer 2 | Parts by weight |  |  | 20 |  |  |  |
| Copolymer 3 | Parts by weight |  |  |  |  | 20 | 20 | 20 |
| Oil | Parts by weight |  | 100 | 80 | 80 | 10 | 180 |
| tan δ(100° C.) | Index value | 100 | 110 | 120 | 70 | 70 | 130 |
| High-temperature Modulus | Index value | 100 | 93 | 88 | 130 | 125 | 75 |
| High-temperature Tensile Strength at Break | Index value | 100 | 92 | 82 | 125 | 120 | 70 |

TABLE 2

|  |  | Working Example 1 | Working Example 2 | Working Example 3 | Working Example 4 | Working Example 5 |
|---|---|---|---|---|---|---|
| SBR 1 | Parts by weight | 137.5 (100) | 137.5 (100) | 137.5 (100) |  |  |
| SBR 2 | Parts by weight |  |  |  | 137.5 (100) |  |
| SBR 3 | Parts by weight |  |  |  |  | 137.5 (100) |
| CB1 | Parts by weight | 100 | 100 |  | 100 | 100 |
| CB3 | Parts by weight |  |  | 100 |  |  |
| Copolymer 3 | Parts by weight | 20 | 50 | 20 | 20 | 20 |
| Oil | Parts by weight | 80 | 50 | 80 | 80 | 80 |
| tanδ(100° C.) | Index value | 119 | 130 | 108 | 124 | 128 |
| High-temperature Modulus | Index value | 103 | 101 | 107 | 105 | 101 |
| High-temperature Tensile Strength at Break | Index value | 103 | 100 | 108 | 108 | 101 |

The types of raw materials used as per Tables 1 and 2 are described below.

S-SBR1: Solution-polymerized styrene-butadiene rubber; styrene quantity of 37 weight %; vinyl quantity of 42 weight %; Mw of 1,260,000; Tg of −27° C.; oil extended product including 37.5 parts by weight of oil per 100 parts by weight of the diene rubber; Tafuden E581 (manufactured by Asahi Kasei Chemicals Corporation)

S-SBR2: Solution-polymerized styrene-butadiene rubber; styrene quantity of 36 weight %; vinyl quantity of 65 weight %; Mw of 1,600,000; Tg of −13° C.; oil extended product including 37.5 parts by weight of oil per 100 parts by weight of the diene rubber; Tafuden E680 (manufactured by Asahi Kasei Chemicals Corporation)

S-SBR3: Solution-polymerized styrene-butadiene rubber; styrene quantity of 48 weight %; vinyl quantity of 52 weight %; Mw of 1,500,000; Tg of −7° C.; oil extended product including 37.5 parts by weight of oil per 100 parts by weight of the diene rubber; Nipol NS462 (manufactured by Nihon Zeon Corporation)

CB1: Carbon black, CD2019 (manufactured by Columbia Carbon Corporation), $N_2SA$ of 340 $m^2/g$ CB2: Carbon black; SEAST KHA (manufactured by Tokai Carbon Co., Ltd.); $N_2SA$ of 77 $m^2/g$ CB3: Carbon black; DIA BLACK UX10 (manufactured by Mitsubishi Chemical Corp.); $N_2SA$ of 182 $m^2/g$ Copolymer 1: Aromatic modified terpene resin (YS Resin TO125, manufactured by Yasuhara Chemical Co., Ltd.; Softening point=125° C.)

Copolymer 2: Terpene-phenol copolymer (YS Polyster T145, manufactured by Yasuhara Chemical Co., Ltd.; Softening point=145° C.)

Copolymer 3: 4-methyl-amethyl-styrene/indene copolymer (FMR0150, manufactured by Mitsui Chemicals, Inc.; Softening point=145° C.)

Oil: Extract No. 4S (manufactured by Showa Shell Seikyu K.K.)

TABLE 3

| Common components of the rubber compositions | | |
|---|---|---|
| Zinc oxide | 3.0 | Parts by weight |
| Stearic acid | 2.0 | Parts by weight |
| Sulfur | 1.5 | Parts by weight |
| Vulcanization accelerator | 3.0 | Parts by weight |

The types of raw materials used as indicated in Table 3 are shown below.

Zinc oxide: Zinc Oxide #3 (manufactured by Seido Chemical Industry Co., Ltd.)

Stearic acid: Beads Stearic Acid YR (manufactured by NOF Corp.)

Sulfur: Golden Flower oil treated sulfur powder, manufactured by Tsurumi Chemical Industry Co., Ltd.

Vulcanization accelerator: Nocceler CZ-G, manufactured by Ouchi Shinko Chemical Industrial Co., Ltd.

As evident from Tables 1 and 2, great 300% modulus, tensile strength at break and tan δ (100° C.) in high-temperature state were confirmed for the tire rubber compositions of Working Examples 1 to 5, indicating that when the composition was made into a pneumatic tire, the tire has excellent dry grip performance, can sustain the grip performance for a long duration and exhibit excellent wear resistance.

Because aromatic modified terpene resin (copolymer 1) was blended instead of the aromatic copolymer of the present technology for the rubber composition of Comparative Example 2, 300% modulus and tensile strength at break at 100° C. were decreased, indicating that when the composition is made into a tire, grip performance sustainability and wear resistance degrades at high temperature due to high-speed running.

Because terpene phenol copolymer (copolymer 2) was blended instead of the aromatic copolymer of the present technology for the rubber composition of the Comparative Example 3, 300% modulus and tensile strength at break at 100° C. were decreased, indicating that when the composition is made into a pneumatic tire, grip performance sustainability and wear resistance deteriorates at high temperature due to high-speed running.

Because the rubber composition of Comparative Example 4 contains carbon black (CB2) having $N_2SA$ of less than 80 $m^2/g$, tan δ at 100° C. is decreased and when the composition is made into a tire, dry grip performance deteriorates.

Because the rubber composition of Comparative Example 5 contains carbon black less than 40 parts by weight, tan δ at 100° C. decreased and when the composition is made into a tire, dry grip performance deteriorates.

Because the rubber composition of Comparative Example 6 contains carbon black greater than 180 parts by weight, 300% modulus and tensile strength at break at 100° C. decreased, indicating that when the composition is made into a pneumatic tire, grip performance sustainability and wear resistance deteriorate at high temperature due to high-speed running.

The invention claimed is:

1. A tire rubber composition comprising from greater than 70 parts by weight to 180 parts by weight or less of carbon black having a nitrogen adsorption specific surface area of from greater than 150 $m^2/g$ to 400 $m^2/g$ or less and 1 to 100 parts by weight of aromatic copolymer blended in 100 parts by weight of diene rubber, the aromatic copolymer being a copolymer of an α-methylstyrene derivative represented by general formula (I) and indene:

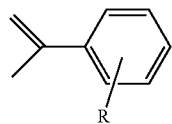 (I)

wherein R is an alkyl group having from 1 to 3 carbons.

2. The tire rubber composition according to claim 1, wherein a softening point of the aromatic copolymer is 100 to 150° C.

3. A pneumatic tire comprising the tire rubber composition described in claim 1.

4. A pneumatic tire comprising the tire rubber composition described in claim 2.

5. The tire rubber composition according to claim 1, wherein a content of styrene included in the styrene-butadiene rubber is from 25 to 50 weight %.

6. The tire rubber composition according to claim 1, wherein a vinyl content in the styrene-butadiene rubber is from 10 to 75 weight %.

7. The tire rubber composition according to claim 1, wherein a glass transition temperature (Tg) of the styrene-butadiene rubber is from −45 to −5° C.

8. The tire rubber composition according to claim 1, wherein a weight average molecular weight of the styrene-butadiene rubber is from 500,000 to 2,000,000.

9. The tire rubber composition according to claim 1, comprising from not less than 90 parts by weight to not greater than 140 parts by weight of the carbon black.

10. The tire rubber composition according to claim 1, wherein the carbon black has a nitrogen adsorption specific surface area of from not less than 250 m$^2$/g to not greater than 390 m$^2$/g.

* * * * *